(12) United States Patent
Chen et al.

(10) Patent No.: US 12,288,028 B2
(45) Date of Patent: Apr. 29, 2025

(54) INFERENCER, INFERENCE METHOD AND INFERENCE PROGRAM

(71) Applicant: NATIONAL INSTITUTE OF INFORMATION AND COMMUNICATIONS TECHNOLOGY, Koganei (JP)

(72) Inventors: Kehai Chen, Koganei (JP); Rui Wang, Koganei (JP); Masao Uchiyama, Koganei (JP); Eiichiro Sumita, Koganei (JP)

(73) Assignee: NATIONAL INSTITUTE OF INFORMATION AND COMMUNICATIONS TECHNOLOGY, Koganei (JP)

( * ) Notice: Subject to any disclaimer, the term of this patent is extended or adjusted under 35 U.S.C. 154(b) by 526 days.

(21) Appl. No.: 17/617,770

(22) PCT Filed: Jul. 6, 2020

(86) PCT No.: PCT/JP2020/026397
§ 371 (c)(1),
(2) Date: Dec. 9, 2021

(87) PCT Pub. No.: WO2021/010203
PCT Pub. Date: Jan. 21, 2021

(65) Prior Publication Data
US 2022/0237380 A1 Jul. 28, 2022

(30) Foreign Application Priority Data
Jul. 18, 2019 (JP) ................................. 2019-133107

(51) Int. Cl.
*G06F 17/00* (2019.01)
*G06F 40/126* (2020.01)
(Continued)

(52) U.S. Cl.
CPC .......... *G06F 40/284* (2020.01); *G06F 40/126* (2020.01); *G06F 40/166* (2020.01);
(Continued)

(58) Field of Classification Search
CPC . G06N 3/08; G06N 3/044; G06N 5/04; G06F 40/30; G06F 40/284; G06F 40/00;
(Continued)

(56) References Cited

U.S. PATENT DOCUMENTS

| | | | |
|---|---|---|---|
| 2018/0196800 A1* | 7/2018 | Volkovs | G06F 40/30 |
| 2020/0265196 A1* | 8/2020 | Ravi | G06N 20/00 |

OTHER PUBLICATIONS

Im, Jinbae, and Sungzoon Cho. "Distance-based self-attention network for natural language inference." arXiv preprint arXiv: 1712.02047 (2017). (Year: 2017).*

(Continued)

*Primary Examiner* — Michael Ortiz-Sanchez
(74) *Attorney, Agent, or Firm* — Sughrue Mion, PLLC

(57) ABSTRACT

Improvement is made in performance of a trained neural network that uses positional information indicating a position at which each token included in an input sequence is present in the input sequence. An inferencer includes a first generation unit that generates an intermediate sentence representation based on a first sentence representation having information indicating a value of each token included in the input sequence and first positional information indicating a position at which each token is present in the input sequence; a second generation unit that generates second positional information by modifying the first positional information based on the first sentence representation and the intermediate sentence representation, and that generates a hidden state representation based on the second positional information and the intermediate sentence representation; and a third generation unit that generates a second sentence (Continued)

representation based on the intermediate sentence representation and the hidden state representation.

3 Claims, 7 Drawing Sheets

(51) Int. Cl.
    *G06F 40/166*      (2020.01)
    *G06F 40/284*      (2020.01)
    *G06N 3/08*      (2023.01)
    *G06N 5/04*      (2023.01)
    *G06F 40/44*      (2020.01)

(52) U.S. Cl.
    CPC ................. *G06N 3/08* (2013.01); *G06N 5/04* (2013.01); *G06F 40/44* (2020.01)

(58) Field of Classification Search
    CPC .... G06F 40/126; G06F 40/216; G06F 40/205; G06F 18/214; G06F 40/166; G06F 40/44; G10L 15/16; G10L 15/18; G10L 15/063; G10L 25/30; G16B 40/30
    See application file for complete search history.

(56) References Cited

OTHER PUBLICATIONS

Shen, Tao, et al. "Reinforced self-attention network: a hybrid of hard and soft attention for sequence modeling." arXiv preprint arXiv: 1801.10296 (2018). (Year: 2018).*

Shen, Tao, et al. "Disan: Directional self-attention network for rnn/cnn-free language understanding." Proceedings of the AAAI conference on artificial intelligence. vol. 32. No. 1. 2018. (Year: 2018).*

Ning Dai et al., "Style Transformer: Unpaired Text Style Transfer without Disentangled Latent Representation", online, 2019, [retrieved on Aug. 28, 2020], Internet :<URL:https://arxiv.org/pdf/1905.05621v2.pdf>, 11 pages.

Yuki Kawara et al., "Analysis of the Effects of Presorting in Neural Machine Translation", Proceedings of the 25th Annual Meeting of the Association for Natural Language Processing, 2019, pp. 1455-1458.

A. Vaswani et al., "Attention Is All You Need," 31st Conference on Neural Information Processing Systems (NIPS 2017), 2017, 15 pages.

Jonas Gehring et al., "A Convolutional Encoder Model for Neural Machine Translation", Proceedings of the 55th Annual Meeting of the Association for Computational Linguistics, 2017, pp. 123-135, vol. 1.

Michel Galley et al., "A Simple and Effective Hierarchical Phrase Reordering Model", Proceedings of the 2008 Conference on Empirical Methods in Natural Language Processing, 2008, pp. 848-856.

Isao Goto et al., "Post-Ordering by Parsing with ITG for Japanese-English Statistical Machine Translation," ACM Transactions on Asian Language Information Processing, 2013, pp. 17:1-17:22, vol. 12, No. 4, Article 17.

Ilya Sutskever et al., "Sequence to Sequence Learning with Neural Networks", Advances in neural information processing systems, 2014, pp. 3104-3112.

Dzmitry Bahdanau et al., "Neural Machine Translation by Jointly Learning to Align and Translate," Proceedings of the 3rd International Conference on Learning Representations, 2015, 15 pages.

Jinchao Zhang et al., "Incorporating Word Reordering Knowledge into Attention-based Neural Machine Translation", Proceedings of the 55th Annual Meeting of the Association for Computational Linguistics, 2017, pp. 1524-1534, vol. 1.

Toshiaki Nakazawa et al., "ASPEC: Asian Scientific Paper Excerpt Corpus", Proceedings of the Tenth International Conference on Language Resources and Evaluation, 2016, pp. 2204-2208.

Yonghui Wu et al., "Google's Neural Machine Translation System: Bridging the Gap between Human and Machine Translation", 2016, 23 pages.

Jonas Gehring et al., "Convolutional Sequence to Sequence Learning", Proceedings of the 34th International Conference on Machine Learning, 2017, pp. 1243-1252, vol. 70.

Peter Shaw et al., "Self-Attention with Relative Position Representations", Proceedings of the 2018 Conference of the North American Chapter of the Association for Computational Linguistics: Human Language Technologies, 2018, pp. 464-468, vol. 2.

Fandong Meng et al.,, "DTMT: A Novel Deep Transition Architecture for Neural Machine Translation," Association for the Advancement of Artificial Intelligence, 2019, 8 pages.

Xiang Kong et al., "Neural Machine Translation with Adequacy-Oriented Learning," Association for the Advancement of Artificial Intelligence, 2019, 8 pages.

Yang Zhao et al., "Addressing Troublesome Words in Neural Machine Translation", Proceedings of the 2018 Conference on Empirical Methods in Natural Language Processing, 2018, pp. 391-400.

International Search Report of PCT/JP2020/026397 dated Sep. 8, 2020 [PCT/ISA/210].

* cited by examiner

INFERENCER, INFERENCE METHOD AND INFERENCE PROGRAM

CROSS REFERENCE TO RELATED APPLICATIONS

This application is a National Stage of International Application No. PCT/JP2020/026397 filed on Jul. 6, 2020, claiming priority based on Japanese Patent Application No. 2019-133107 filed on Jul. 18, 2019, the entire contents of each of which being herein incorporated by reference in their entireties.

TECHNICAL FIELD

The present technology relates to an inferencer, an inference method, and an inference program for outputting an output sequence corresponding to an input sequence including one or more tokens.

BACKGROUND ART

In the technical field of natural language processing, various Attention-based models have been proposed. As an example of such Attention-based models, a model called "Transformer", which is applicable to machine translation or the like, has been drawing attention (NPL 1).

The Transformer has high performance by using a self-Attention network (SAN). The Transformer generates an ordered positional embedding sequence using a positional encoding mechanism (see NPL 2 or the like) that explicitly encodes word order dependency between words in a sentence. In the Transformer, in order to learn sentence representations for predicting translations, the SAN is trained in a multi-head manner and is configured in a multi-layer manner.

CITATION LIST

Patent Literature

NPL 1: A. Vaswani, N. Shazeer, N. Parmar, J. Uszkoreit, L. Jones, A. Gomez, L. Kaiser, and I. Polosukhin, "Attention is all you need," in CoRR abs/1706.03762, 2017.
NPL 2: Jonas Gehring, Michael Auli, David Grangier, and Yann Dauphin, "A convolutional encoder model for neural machine translation," In Proceedings of the 55th Annual Meeting of the Association for Computational Linguistics (Volume 1: Long Papers), pages 123-135, Vancouver, Canada. Association for Computational Linguistics, 2017.
NPL 3: Michel Galley and Christopher D. Manning, "A simple and effective hierarchical phrase reordering model," In Proceedings of the 2008 Conference on Empirical Methods in Natural Language Processing, pages 848-856, Honolulu, Hawaii Association for Computational Linguistics, 2008.
NPL 4: Isao Goto, Masao Utiyama, and Eiichiro Sumita, "Post-ordering by parsing with itg for Japanese-English Statistical Machine Translation," ACM Transactions on Asian Language Information Processing, 12(4):17:1-17: 22, 2013.
NPL 5: Ilya Sutskever, Oriol Vinyals, and Quoc V Le, "Sequence to sequence learning with neural networks," In Advances in neural information processing systems, pages 3104-3112. Curran Associates, Inc, 2014.
NPL 6: Dzmitry Bandanau, Kyunghyun Cho, and Yoshua Bengio, "Neural machine translation by jointly learning to align and translate," In Proceedings of the 3rd International Conference on Learning Representations, San Diego, CA, 2015.
NPL 7: Jinchao Zhang, Mingxuan Wang, Qun Liu, and Jie Zhou, "Incorporating word reordering knowledge into attention-based neural machine translation," In Proceedings of the 55th Annual Meeting of the Association for Computational Linguistics (Volume 1: Long Papers), pages 1524-1534, Vancouver, Canada. Association for Computational Linguistics, 2017.
NPL 8: Toshiaki Nakazawa, Manabu Yaguchi, Kiyotaka Uchimoto, Masao Utiyama, Eiichiro Sumita, Sadao Kurohashi, and Hitoshi Isahara, "ASPEC: Asian scientific paper excerpt corpus," In Proceedings of the Tenth International Conference on Language Resources and Evaluation (LREC 2016), pages 2204-2208, Portoroz, Slovenia. European Language Resources Association (ELRA), 2016.
NPL 9: Yonghui Wu, Mike Schuster, Zhifeng Chen, Quoc V. Le, Mohammad Norouzi, Wolfgang Macherey, Maxim Krikun, Yuan Cao, Qin Gao, Klaus Macherey, Jeff Klingner, Apurva Shah, Melvin Johnson, Xiaobing Liu, Lukasz Kaiser, Stephan Gouws, Yoshikiyo Kato, Taku Kudo, Hideto Kazawa, Keith Stevens, George Kurian, Nishant Patil, Wei Wang, Cliff Young, Jason Smith, Jason Riesa, Alex Rudnick, Oriol Vinyals, Greg Corrado, Macduff Hughes, and Jeffrey Dean, "Google's neural machine translation system: Bridging the gap between human and machine translation,", CoRR, abs/1609.08144, 2016.
NPL 10: Jonas Gehring, Michael Auli, David Grangier, Denis Yarats, and Yann N. Dauphin, "Convolutional sequence to sequence learning," In Proceedings of the 34th International Conference on Machine Learning, volume 70 of Proceedings of Machine Learning Research, pages 1243-1252, International Convention Centre, Sydney, Australia. PMLR, 2017.
NPL 11: Peter Shaw, Jakob Uszkoreit, and Ashish Vaswani, "Self-attention with relative position representations," In Proceedings of the 2018 Conference of the North American Chapter of the Association for Computational Linguistics: Human Language Technologies, Volume 2 (Short Papers), pages 464-468, New Orleans, Louisiana Association for Computational Linguistics, 2018.
NPL 12: Fandong Meng and Jinchao Zhang, "DTMT: A novel deep transition architecture for neural machine translation," CoRR, abs/1812.07807, 2018. NPL 13: Xiang Kong, Zhaopeng Tu, Shuming Shi, Eduard H. Hovy, and Tong Zhang, "Neural machine translation with adequacy-oriented learning," CoRR, abs/1811.08541, 2018.
NPL 14: Yang Zhao, Jiajun Zhang, Zhongjun He, Chengqing Zong, and HuaWu, "Addressing troublesome words in neural machine translation," In Proceedings of the 2018 Conference on Empirical Methods in Natural Language Processing, pages 391-400, Brussels, Belgium. Association for Computational Linguistics, 2018.

SUMMARY OF INVENTION

Technical Problem

In the Transformer, positional embeddings only pays attention to sequentially encoding order relations between words. However, in consideration of actual speeches by human beings, the order of spoken words may be changed depending on a context or situation. Such a change in the order of spoken words is not taken into consideration at all.

The present technology has an object to improve performance of a trained neural network that uses positional information indicating a position at which each token included in an input sequence is present in the input sequence.

Solution to Problem

According to a certain embodiment, there is provided an inferencer with a trained neural network that outputs an output sequence corresponding to an input sequence. The inferencer includes: a first generation unit that generates an intermediate sentence representation based on a first sentence representation having information indicating a value of each token included in the input sequence and first positional information indicating a position at which each token is present in the input sequence; a second generation unit that generates second positional information by modifying the first positional information based on the first sentence representation and the intermediate sentence representation, and that generates a hidden state representation based on the second positional information and the intermediate sentence representation; and a third generation unit that generates a second sentence representation based on the intermediate sentence representation and the hidden state representation.

The second generation unit may generate a coefficient vector in accordance with an activation function having, as an input, a linear combination of the first sentence representation and the intermediate sentence representation, and may generate the second positional information by multiplying the generated coefficient vector by the first positional information.

The inferencer may further include a positional information output unit that outputs the first positional information indicating the position at which each token is present in the input sequence.

The first generation unit may generate the intermediate sentence representation by inputting the first sentence representation to a trained self-Attention network.

The inferencer may include an encoder that outputs a sequence of intermediate representation in accordance with the input sequence; and a decoder that outputs the output sequence based on the sequence of intermediate representation output from the encoder and an output sequence output previously. At least one of the encoder and the decoder may include a trained block including the first generation unit, the second generation unit, and the third generation unit.

A plurality of the trained blocks may be stacked.

According to another embodiment, there is provided an inference method for outputting an output sequence corresponding to an input sequence using a trained neural network. The inference method includes: generating an intermediate sentence representation based on a first sentence representation having information indicating a value of each token included in the input sequence and first positional information indicating a position at which each token is present in the input sequence; generating second positional information by modifying the first positional information based on the first sentence representation and the intermediate sentence representation, and generating a hidden state representation based on the second positional information and the intermediate sentence representation; and generating a second sentence representation based on the intermediate sentence representation and the hidden state representation.

According to still another embodiment, there is provided an inference program for causing a computer to perform the above-described inference method.

Advantageous Effects of Invention

According to the present technology, it is possible to improve performance of a trained neural network that uses positional information indicating a position at which each token included in an input sequence is present in the input sequence.

DESCRIPTION OF EMBODIMENTS

Figure 1:
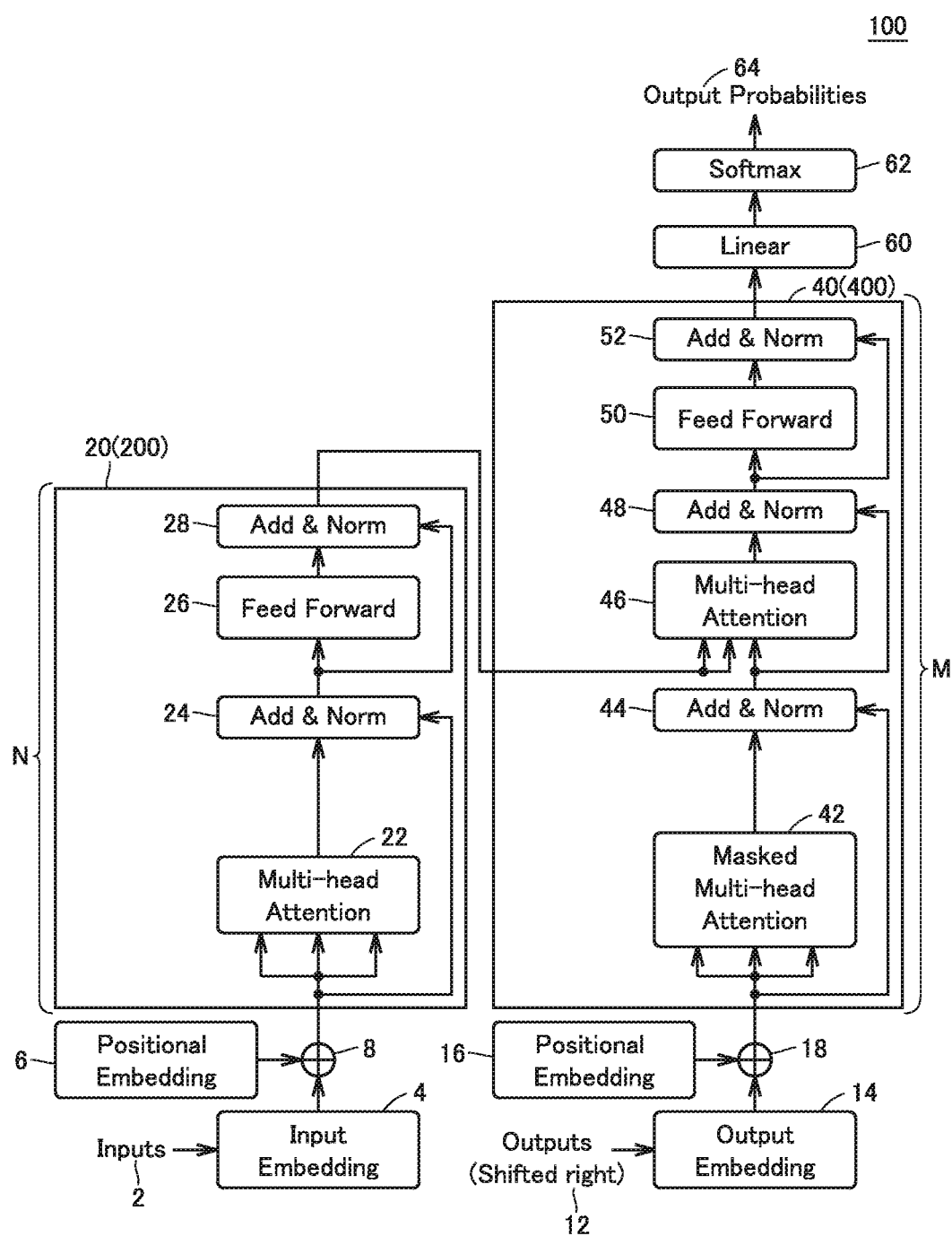
FIG. 1 is a schematic diagram showing an exemplary Transformer according to a technology related to the present technology.

Embodiments of the present technology will be described in detail with reference to figures. It should be noted that in the figures, the same or corresponding portions are denoted by the same reference characters and will not be described repeatedly.

A. RELATED TECHNOLOGY

As a technology related to the present technology, a general Transformer will be described.

FIG. 1 is a schematic diagram showing an exemplary Transformer 100 according to the technology related to the present technology. Referring to FIG. 1, Transformer 100 is a trained model and corresponds to one form of a neutral network.

Transformer 100 includes N stacked layers of encoder blocks 20 and M stacked layers of decoder blocks 40. Encoder blocks 20 and decoder blocks 40 correspond to trained blocks. The N stacked layers of encoder blocks 20 are also collectively referred to as "encoder 200". The M stacked layers of decoder blocks 40 are also collectively referred to as "decoder 400".

Encoder 200 outputs a sequence of intermediate representation in accordance with the input sequence. Decoder 40 outputs an output sequence based on the sequence of intermediate representation output from encoder 20 and an output sequence output previously.

An input token string generated by an input embedding layer 4, a positional embedding layer 6, and an adder 8 is input to encoder 200 (that is, the first layer of the N layers of encoder blocks 20). Encoder 200 (that is, the final layer of the N layers of encoder blocks 20) outputs an intermediate sentence representation as a calculation result.

Input embedding layer 4 divides an input sequence (Inputs) 2 such as a sentence into one or more tokens based on a predetermined unit as a unit (for example, based on a word as a unit), and generates one or more vectors each having predetermined dimensions indicating the value of a corresponding divided token. For example, input sequence 2 corresponds to a sentence (source sentence) of a source language. As a result, input embedding layer 4 outputs, as a word embedding, a sequence including the same number of vector(s) each having the predetermined dimensions as the number of the token(s).

Positional embedding layer 6 outputs a positional embedding, which is a value indicating a position at which the token is present in input sequence 2.

Adder 8 adds the positional embedding from positional embedding layer 6, to the sequence from input embedding layer 4. As a result, adder 8 outputs an input token string (vector) obtained by adding, to the vector indicating the value of the token (for example, word) included in the sentence, the value (relative or absolute position in input sequence 2) indicating the position at which the token is present in the sentence.

Each of encoder blocks 20 includes an MHA (Multi-head Attention) layer 22, a feed forward layer 26, and add & norm layers 24, 28.

MHA layer 22 calculates an Attention for the input token string (vector). The Attention refers to processing for extracting necessary information from a memory with respect to a query. A self-Attention refers to an Attention for which the query and the memory (key and value) use a common tensor.

MHA layer 22 includes a plurality of self-Attentions arranged in parallel. MHA layer 22 divides the query and the memory (key and value) by the number of the self-Attentions, processes the divided queries and memories (keys and values), and combines the processing results. That is, in MHA layer 22, processing for calculating Attentions is parallel.

Add & norm layer 24 adds, to the input token string (vector), the vector output from MHA layer 22, and then performs normalization using any method.

Feed forward layer 26 shifts a position (that is, input time) with respect to the input vector.

Add & norm layer 28 adds, to the vector output from add & norm layer 24, the vector output from feed forward layer 26, and then performs normalization using any method.

An output token string generated by an output embedding layer 14, a positional embedding layer 16, and an adder 18 is input to decoder 400 (that is, the first layer of the M layers of decoder blocks 40). Decoder 400 (that is, the final layer of the M layers of decoder blocks 40) outputs an output sequence as a calculation result.

Output embedding layer 14 divides an already output sequence (output sequence shifted to match the time to that of a previous output sequence) (Outputs (Shifted right)) 12 into one or more tokens based on a predetermined unit as a unit, and generates one or more vectors each having predetermined dimensions indicating the value of a corresponding divided token. As a result, output embedding layer 14 outputs, as an output embedding, a token string including the same number of vector(s) each having predetermined dimensions as the number of the token(s).

Positional embedding layer 16 outputs a positional embedding, which is a value indicating a position at which the token is present in already output sequence 12.

Adder 18 adds the positional embedding from positional embedding layer 16, to the token string from output embedding layer 14. As a result, adder 18 outputs an output token string (vector) obtained by adding, to the vector indicating the value of the token included in the sentence, the value (relative or absolute position in existing output sequence 12) indicating the position at which the token is present in the sentence.

Each of decoder blocks 40 includes a MMHA (Masked Multi-head Attention) layer 42, an MHA (Multi-head Attention) layer 46, a feed forward layer 50, and add & norm layers 44, 48, 52. That is, decoder block 40 has a configuration similar to that of encoder block 20 but is different therefrom in that decoder block 40 includes MMHA layer 42 and add & norm layer 44.

MMHA layer 42 performs mask processing onto a vector that cannot be present among the previously calculated vectors.

Add & norm layer 44 adds, to the output token string (vector), the vector output from MMHA layer 42, and then performs normalization using any method.

MHA layer 46 calculates an Attention for the intermediate sentence representation output from add & norm layer 28 of encoder block 20 and the vector output from add & norm layer 44. Basic processing of MHA layer 46 is the same as that of MHA layer 22.

Add & norm layer 48 adds, to the vector output from add & norm layer 44, the vector output from MHA layer 46, and then performs normalization using any method.

Feed forward layer 50 shifts the position (that is, input time) with respect to the input vector.

Add & norm layer 52 adds, to the vector output from MHA layer 46, the vector output from feed forward layer 50, and then performs normalization using any method.

Transformer 100 includes a linear combination (Linear) layer 60 and a softmax layer 62 as output layers. Linear combination layer 60 is disposed on the output side of encoder 200 (that is, the final layer of the M layers of decoder blocks 40), and linearly combines the output sequences from decoder 400.

Softmax layer 62 determines, as an output sequence 64, a result of calculating, using a softmax function, the vector output from linear combination layer 60. Output sequence 64 indicates a probability of a translation target sentence (target sentence) corresponding to input sequence 2 (source sentence).

B. PROBLEM AND SOLUTION

Next, the following generally describes problem and solution with regard to Transformer 100 according to the technology related to the present technology.

In phrase-based statistical machine translation (PBSMT), a reordering model plays an important role to improve translation performance. In particular, the reordering model is effective for translation between languages that differ from each other greatly in terms of word order, such as Chinese-English translation and Japanese-English translation (see, for example, NPL 3, NPL 4, and the like). In conventional PBSMT, a reordering model is generated by learning a large-scale reordering rule from parallel sentence pairs between two languages. Such a reordering model is frequently incorporated into translation decoding processing to ensure a reasonable translation order of original words.

As compared with such an explicit reordering model for PBSMT, it has been reported that fluent translation is achieved when an RNN-based neural machine translation (NMT) is based on a neural network that implicitly encodes word order dependency between words in a sentence (see NPL 5, NPL 6, and the like).

Further, it has been reported that when a position-based Attention in a window having a fixed size is added to a content-based Attention, performance can be significantly improved as compared with the RNN-based NMT (see NPL 7). This means that word reordering information is also effective for NMT.

Although the word reordering information is considered effective for translation tasks as described above, the reordering information in the sentence is not explicitly taken into consideration in such a Transformer 100 as shown in FIG. 1. Further, problems in reordering in NMT have not been studied deeper than those indicated in NPL 7.

The present inventors have found the following new problem: performance is potentially deteriorated due to no word reordering information being taken into consideration in NMT that uses positional embeddings such as Transformer 100.

Accordingly, the present inventors have arrived at a new solution to improve performance by adding the reordering information in the NMT that uses positional embeddings such as Transformer 100.

Hereinafter, an embodiment for implementing such a new solution will be described.

C. NEURAL NETWORK ACCORDING TO THE PRESENT EMBODIMENT

As an exemplary neural network according to the present embodiment, the following describes a Transformer 100A having a configuration for adding reordering information to Transformer 100 shown in FIG. 1. Transformer 100A corresponds to an inferencer with a trained neural network that outputs an output sequence corresponding to an input sequence. However, the technical scope of the present invention is not limited to the Transformer, and can be generally applied to neural networks that use positional embeddings.

Figure 2:
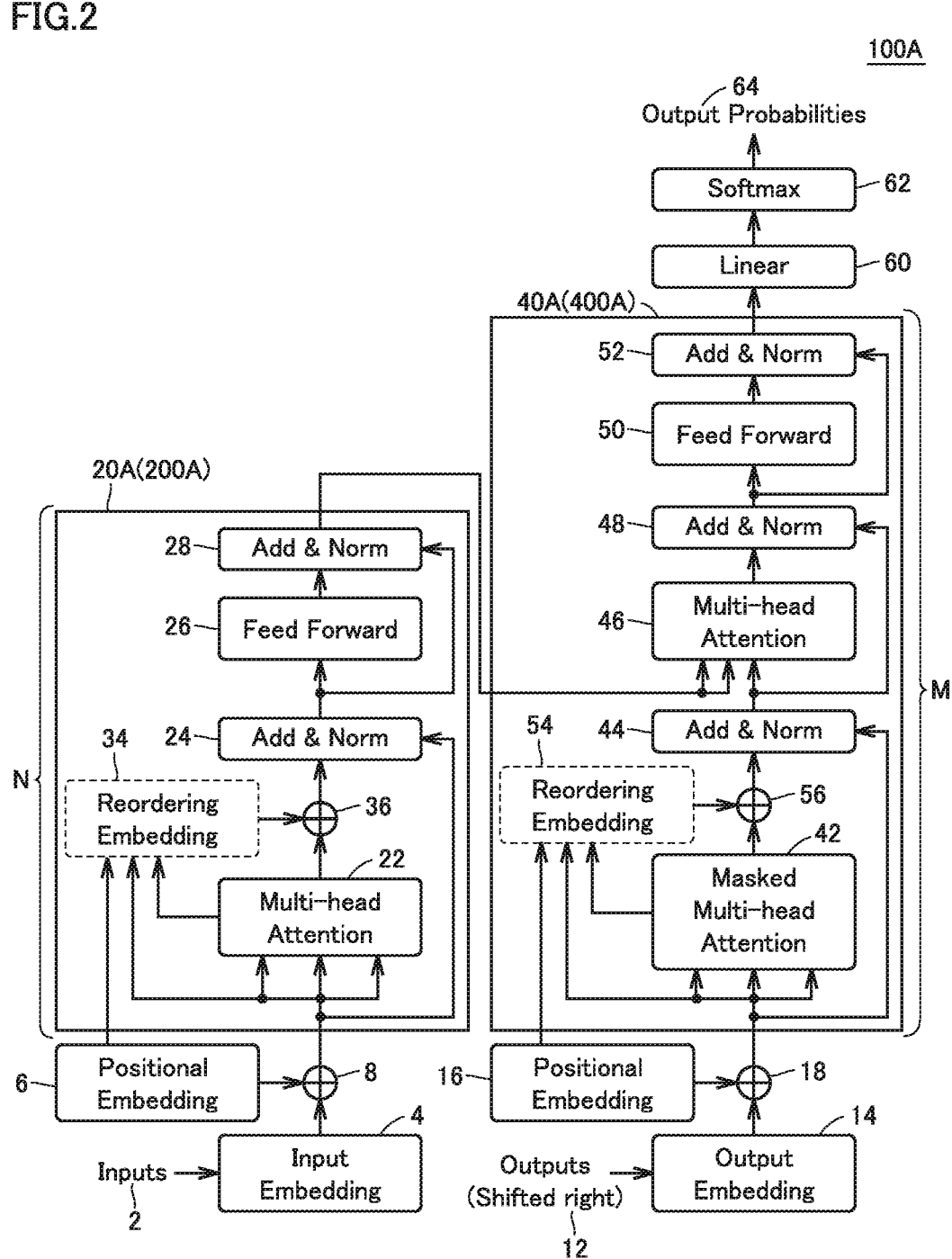
FIG. 2 is a schematic diagram showing a Transformer according to the present embodiment.

FIG. 2 is a schematic diagram showing Transformer 100A according to the present embodiment. As compared with Transformer 100 shown in FIG. 1, Transformer 100A shown in FIG. 2 includes: encoder blocks 20A each further including a reordering embedding layer 34 and an adder 36; and decoder blocks 40A each further including a reordering embedding layer 54 and an adder 56. It should be noted that the reordering embedding layer may be disposed in one of the encoder block and the decoder block as described below and the reordering embedding layers do not need to be disposed in both the encoder block and the decoder block.

In Transformer 100A according to the present embodiment, word reordering information is generated inside the model, thereby generating an inference result corresponding to a change in word order in input sequence 2 having been input.

Figure 3:
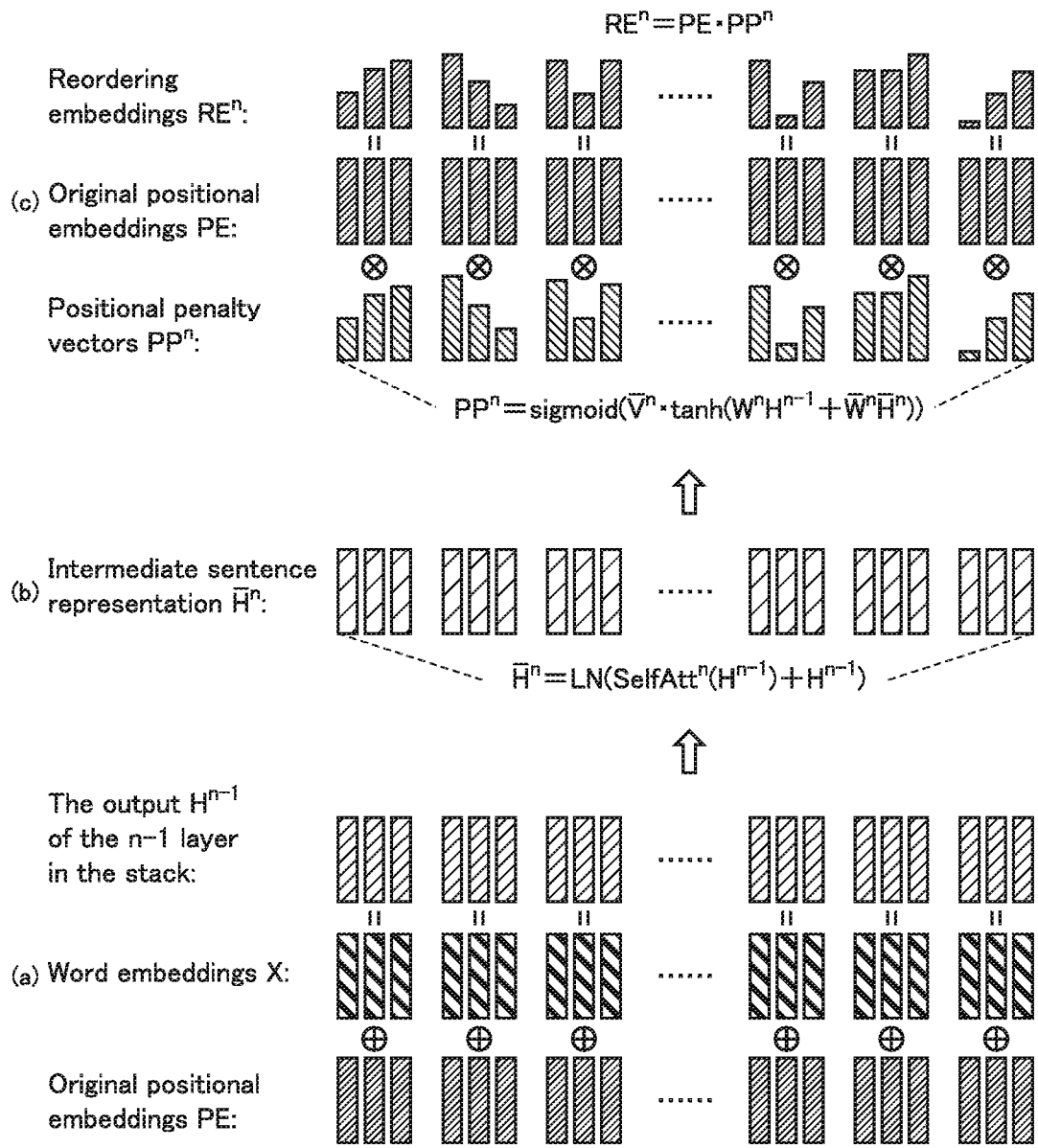
FIG. 3 is a schematic diagram for illustrating an overview of processing in the Transformer according to the present embodiment.

FIG. 3 is a schematic diagram for illustrating an overview of processing in Transformer 100A according to the present embodiment. Details of the mathematical processing in Transformer 100A according to the present embodiment will be described with reference to FIG. 3 (*a*) to FIG. 3 (*c*).

(c1: Positional Encoding Mechanism)

First, a positional encoding mechanism in Transformer 100A will be described. In Transformer 100A, word order dependency between words in a sentence is encoded. For example, assuming word embeddings X={$x_1, \ldots, x_J$} of a source sentence having a length J, a positional embedding sequence is calculated based on the position of each word in accordance with the following formula (1):

$$pe_{(j,2i)} = \sin(j/10000^{2i/d_{model}}), \quad (1)$$
$$pe_{(j,2i+1)} = \cos(j/10000^{2i/d_{model}}),$$

Here, j represents a position index indicating a word position in the sentence, and i represents the number of dimensions of the position index. Therefore, original positional embeddings PE are calculated as in the following formula (2):

$$PE = \{pe_1, \ldots, pe_J\}. \quad (2)$$

Each $pe_j$ is added to a corresponding word embedding $x_j$, and a combined embedding $v_j$ is indicated as in the following formula (3):

$$v_j = x_j + pe_j. \quad (3)$$

Finally, a sequence {$v_1, \ldots, v_J$} of combined embeddings $v_j$, becomes an initial sentence representation $H^0$. Thereafter, sentence representation $H^0$ is input to the MHA (Multihead Attention) layer for learning of the sentence representation.

Thus, positional embedding layer 6 and positional embedding layer 16 correspond to a positional information output unit that outputs first positional information (original positional embeddings PE) indicating a position at which each token is present in the input sequence.

(c2: Self-Attention Mechanism)

Next, a self-Attention mechanism in the MHA layer will be described. In the MHA layer, a plurality of self-Attentions are arranged in parallel, and one of the self-Attentions will be focused on in the following description.

The self-Attention mechanism is used to learn sentence representation $H^0$ obtained in one section before the current section. Normally, the Transformer mechanism uses a configuration in which N encoder blocks 20 (or decoder blocks 40) each having the same configuration are stacked. Each of encoder blocks 20 (or decoder blocks 40) has two sublayers. That is, one sublayer is the self-Attention, and the other sublayer is a feed forward network fully connected in the order of positions. A residual connection is made between these sublayers and a result thereof is regularized.

Finally, the stack to learn the sentence representation can be expressed as the following formula (4):

$$\begin{bmatrix} H^n = LN(SelfAtt^n(H^{n-1}) + H^{n-1}) \\ H^n = LN(FFN^n(H^n) + H^n) \end{bmatrix}_N \quad (4)$$

Here, $SelfAtt^n(\bullet)$, $LN(\bullet)$ and $FFN^n(\bullet)$ respectively correspond to the self-Attention network, a layer regularization, and the forward network in each of N encoder blocks 20 (or decoder blocks 40). Further, $[\ldots]_N$ represents a stack of N layers. In each of encoder 200 and decoder 400 of the Transformer, SelfAtt$^n$(•) of the n-th layer (encoder block 20 or decoder block 40) calculates an Attention for an output $H^{n-1}$ of the (n−1)-th layer (encoder block 20 or decoder block 40) that is the preceding stage in accordance with the following formula (5):

$$SelfAtt^n(H^{n-1}) = \text{softmax}\left(\frac{QK^T}{\sqrt{d_k}}\right)V \tag{5}$$

Here, {Q, K, V} mean a query, a key, and a value, respectively. Intermediate sentence representation $H^{n-1}$ having been input is converted to generate {Q, K, V}. $d_k$ represents the number of dimensions of the query and the key. Finally, a sentence representation $H^N$ from the N-th layer is output from the Transformer as a sentence representation (inference result).

Thus, MHA layer 22 of encoder block 20 and MMHA layer 42 of decoder block 40 correspond to a first generation unit that generates an intermediate sentence representation (intermediate sentence representation $H^n$) based on a first sentence representation (sentence representation $H^0$ or sentence representation $H^{n-1}$). The first sentence representation has information (word embeddings $x_j$) indicating a value of each token included in the input sequence and first positional information (original positional embeddings PE) indicating a position at which each token is present in the input sequence.

In Transformer 100A according to the present embodiment, each of MHA layer 22 of encoder block 20 and MMHA layer 42 of decoder block 40 inputs the first sentence representation (sentence representation $H^0$ or sentence representation $H^{n-1}$) to the trained self-Attention network to generate the intermediate sentence representation (intermediate sentence representation $H^n$).

(c3: Reordering Embeddings)

Next, the following describes processing with regard to extraction and addition of reordering information implemented by reordering embedding layer 34 and adder 36 or by reordering embedding layer 54 and adder 56.

In order to extract the reordering information, in the present embodiment, positional penalty vectors are learned based on given words and a global context of sentences including the words. The positional penalty vectors are used to generate new reordering embeddings by giving penalties to the positional embeddings of the given words. Finally, these reordering embeddings are added to the intermediate sentence representation to substantially implement word reordering. The processing of adding such reordering embeddings can be implemented in the following three steps.

(i) Positional Penalty Vectors

The self-Attention mechanism pays attention to global dependency between words to learn intermediate sentence representation $\overline{H}^n$. Intermediate sentence representation $\overline{H}^n$ is regarded as a global context of a sentence expected to be reordered by a human translator. Therefore, sentence representation $\overline{H}^{n-1}$ output from the preceding stage and new intermediate sentence representation $\overline{H}^n$ (intermediate global context representation $\overline{H}^n$) are used for a sentence having J words so as to learn a positional penalty vector $PP^n$ for the n-th layer of stack [ . . . ]$_N$ in accordance with the following formula (6):

$$PP^n = \text{sigmoid}(\nabla^n \cdot \tanh(W^n \cdot H^{n-1} + \overline{W}^n \cdot \overline{H}^n)) \tag{6}$$

Here, $W^n \in R^{d_{model} \times d_{model}}$, $\overline{W}^n \in R^{d_{model} \times d_{model}}$, $\nabla^n \in R^{d_{model} \times d_{model}}$ represent parameters of the model. $d_{model}$ represents the number of dimensions of the model. Each element $PP^n \in R^{J \times d_{model}}$ of the penalty vectors has a certain real number of 0 to 1.

By applying original positional embeddings PE and word embeddings X to the self-Attention as shown in FIG. 3 (*a*), the intermediate sentence representation can be generated, and positional penalty vectors $PP^n$ can be calculated from the generated intermediate sentence representation as shown in FIG. 3 (*b*).

(ii) Reordering Embeddings

Positional penalty vectors $PP^n$ are used to give penalties to original positional embeddings PE in accordance with the following formula (7):

$$RE^n = PE \cdot PP^n, \tag{7}$$

Here, since each element of positional embeddings PE is multiplied by a probability of 0 to 1, $RE^n$ are referred to as reordering embeddings. As shown in FIG. 3 (*c*), by applying positional penalty vectors $PP^n$ to original positional embeddings PE, reordering embeddings $RE^n$ can be generated.

(iii) Implementation of Reordering

Reordering is implemented for a current sentence hidden state $C^n$ by adding $\overline{H}^n$ to $RE^n$ in accordance with the following formula (8):

$$C^n = LN(\overline{H}^n + RE^n), \tag{8}$$

Here, LN represents layer regularization. As a result, reordering-aware sentence hidden state $C^n$ can be obtained.

Thus, reordering embedding layer 34 of encoder block 20 and reordering embedding layer 54 of decoder block 40 correspond to a second generation unit that generates second positional information (reordering embeddings $RE^n$) by modifying the first positional information (original positional embeddings PE) based on the first sentence representation (sentence representation $H^0$ or sentence representation $H^{n-1}$) and the intermediate sentence representation, and that generates a hidden state representation (sentence hidden state $C^n$) based on the second positional information and the intermediate sentence representation.

As indicated in the formula (6) above, reordering embedding layer 34 and reordering embedding layer 54 generate a coefficient vector (positional penalty vectors $PP^n$) in accordance with an activation function (for example, a sigmoid function) having, as an input, a linear combination of the first sentence representation (sentence representation $H^0$ or sentence representation $H^{n-1}$) and the intermediate sentence representation, and generate the second positional information (reordering embeddings $RE^n$) by multiplying the generated coefficient vector by the first positional information (original positional embeddings PE).

(c4: Self-Attention Networks (SANs) Involving Reordering Embeddings)

The original positional embeddings of the sentence are used to prevent the Transformer from recursively obtaining the word order dependency between the words. This ensures that the stacked SANs learn the sentence representation completely in parallel. Trained $RE^n$ are similar to the original positional embeddings of the sentence. Therefore, trained $RE^n$ can be readily stacked using existing SANs to output a reordering-aware sentence representation for machine translation. In accordance with the above-described formula (4), when SANs are stacked using reordering embeddings, the following formula (9) is obtained:

$$\begin{bmatrix} \tilde{H}^n = LN(SelfAtt^n(H^{n-1}) + H^{n-1}) \\ PP^n = \text{sigmoid}(V^n \cdot \tanh(W^n \cdot H^{n-1} + \overline{W}^n \cdot \tilde{H}^n)) \\ C^n = LN(\tilde{H}^n + PE \cdot PP^n) \\ H^n = LN(FFN^n(C^n) + \tilde{H}^n), \end{bmatrix}_N \quad (9)$$

Here, $H^0$ is an initial sentence representation as described above. Finally, a reordering-aware sentence representation $H^N$ for machine translation is output.

Thus, feed forward layer 26 of encoder block 20 and feed forward layer 50 of decoder block 40 correspond to a third generation unit that generates a second sentence representation (sentence representation $H^n$) based on the intermediate sentence representation and the hidden state representation (sentence hidden state $C^n$).

D. HARDWARE CONFIGURATION

Next, the following describes an exemplary hardware configuration for implementing the inferencer including Transformer 100A according to the present embodiment.

Figure 4:
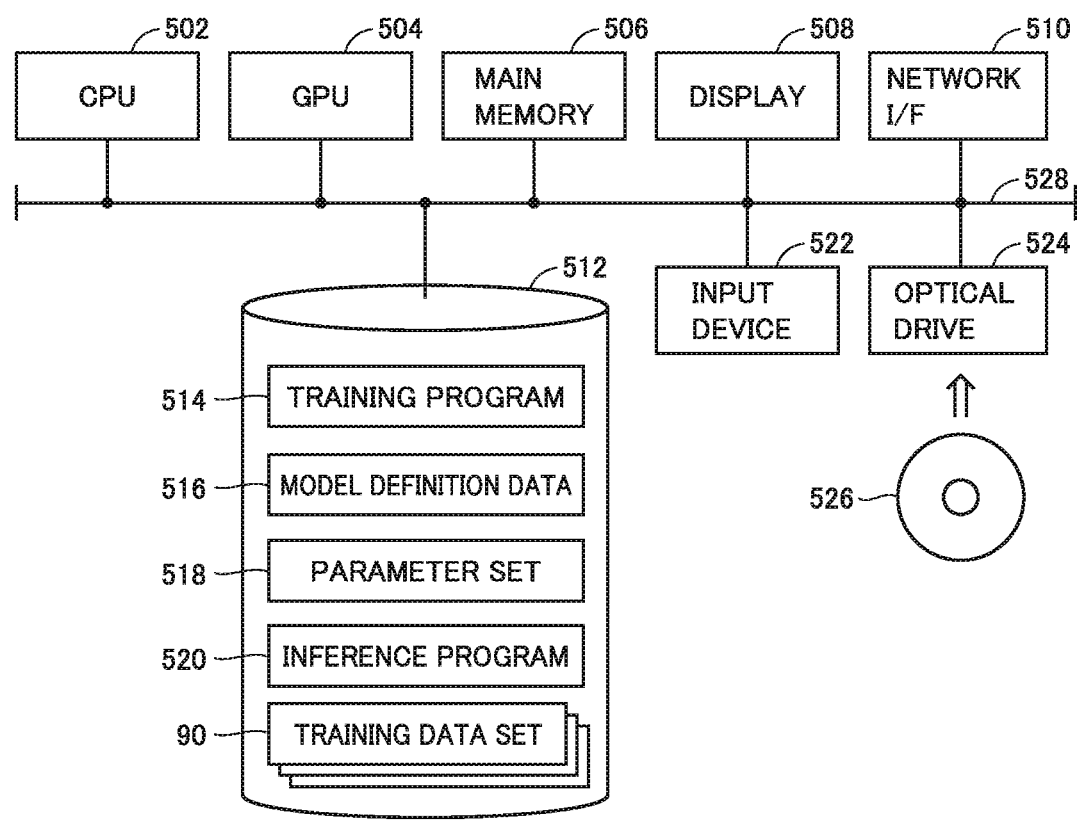
FIG. 4 is a schematic diagram showing an exemplary hardware configuration for implementing an inferencer including the Transformer according to the present embodiment.

FIG. 4 is a schematic diagram showing an exemplary hardware configuration for implementing the inferencer including Transformer 100A according to the present embodiment. Transformer 100A is typically implemented using an information processing device 500, which is an exemplary computer.

Referring to FIG. 4, information processing device 500 that implements Transformer 100A includes a CPU (central processing unit) 502, a GPU (graphics processing unit) 504, a main memory 506, a display 508, a network interface (I/F) 510, a secondary storage device 512, an input device 522, and an optical drive 524 as main hardware components. These components are connected to one another via an internal bus 528.

CPU 502 and/or GPU 504 are processors that perform processing necessary to implement Transformer 100A according to the present embodiment. A plurality of CPUs 502 and GPUs 504 may be disposed, or a plurality of cores may be provided.

Main memory 506 is a storage area for temporarily storing (or caching) program codes, work data, and the like when the processor (CPU 502 and/or GPU 504) performs processing, and is constituted of, for example, a volatile memory device such as a DRAM (dynamic random access memory) or an SRAM (static random access memory).

Display 508 is a display unit that outputs a user interface related to the processing, a processing result, and the like, and is constituted of an LCD (liquid crystal display), an organic EL (electroluminescence) display, or the like, for example.

Network interface 510 exchanges data with any information processing device on the Internet or on an intranet. As network interface 510, any communication method can be employed, such as Ethernet (registered trademark), wireless LAN (local area network), or Bluetooth (registered trademark).

Input device 522 is a device that receives an instruction, an operation, or the like from a user, and is constituted of a keyboard, a mouse, a touch panel, a pen, or the like, for example. Further, input device 522 may include a sound collection device for collecting an audio signal required for training and decoding, or may include an interface for receiving input of the audio signal collected by the sound collection device.

Optical drive 524 reads out information stored in an optical disc 526 such as a CD-ROM (compact disc read only memory) or a DVD (digital versatile disc), and outputs the information to another component via internal bus 528. Optical disc 526 is an exemplary non-transitory recording medium, and is distributed with an arbitrary program being stored in a nonvolatile manner. By reading out the program from optical disk 526 using optical drive 524 and installing the program into secondary storage device 512 or the like, the computer functions as information processing device 500. Therefore, the subject matter of the present invention may be the program itself installed in secondary storage device 512 or the like, or a recording medium such as optical disk 526 that stores the program for implementing the functions and processing according to the present embodiment.

Although the optical recording medium such as optical disk 526 is illustrated as the exemplary non-transitory recording medium in FIG. 4, it is not limited thereto, and there can be used a semiconductor recording medium such as a flash memory, a magnetic recording medium such as a hard disk or a storage tape, or a magneto-optical recording medium such as an MO (magneto-optical disk).

Secondary storage device 512 stores the programs and data required to cause the computer to function as information processing device 500. For example, secondary storage device 512 is constituted of a non-volatile storage device such as a hard disk or an SSD (solid state drive).

More specifically, secondary storage device 512 stores an OS (operating system) (not shown), a training program 514 for implementing training processing, model definition data 516 that defines the structure of Transformer 100A, a parameter set 518 constituted of a plurality of parameters that define Transformer 100A (trained model), an inference program 520, and a training data set 90.

Training program 514 is executed by the processor (CPU 502 and/or GPU 504) to implement the training processing for determining parameter set 518. That is, training program 514 causes the computer to execute a training method for training Transformer 100A.

Model definition data 516 includes information for defining components included in Transformer 100A, a connection relation between the components, and the like. Parameter set 518 includes parameters for the components of Transformer 100A. Each of the parameters included in parameter set 518 is optimized by executing training program 514. Training data set 90 includes a combination of pieces of data as shown in FIG. 4.

Inference program 520 implements Transformer 100A and the inferencer including Transformer 100A based on model definition data 516 and parameter set 518. Further, inference processing using Transformer 100A is performed.

Part of libraries or function modules required when the processor (CPU 502 and/or GPU 504) executes a program may be replaced with libraries or function modules provided by the OS by default. In this case, the program itself does not include all the program modules required to implement the corresponding functions; however, intended processing can be implemented by installing the program in an execution environment of the OS. Such a program that does not include part of the libraries or functional modules can be included in the technical scope of the present invention.

Further, such a program may be distributed with the program being stored in any recording medium as described above and may be distributed by downloading the program from a server device or the like via the Internet or an intranet.

FIG. 4 shows an example in which information processing device 500 is constructed using a single computer; however, it is not limited thereto, and the inferencer including Transformer 100A may be implemented by explicit or implicit cooperation of a plurality of computers connected via a computer network.

Whole or part of the functions implemented by the processor (CPU 502 and/or GPU 504) executing the program may be implemented by using a hard-wired circuit such as an integrated circuit. For example, whole or part of the functions may be implemented by using an ASIC (application specific integrated circuit), an FPGA (field-programmable gate array), or the like.

One having ordinary skill in the art can implement information processing device 500 according to the present embodiment by appropriately using a technology suitable in an era in which the present invention is practiced.

For convenience of description, it is illustratively described that the training processing and the inference processing are performed using the same information processing device 500; however, the training processing and the inference processing may be implemented using different pieces of hardware.

E. TRAINING PROCESSING AND INFERENCE PROCESSING

The training processing and the inference processing for Transformer 100A according to the present embodiment are the same as the training processing and the inference process for Transformer 100 according to the technology related to the present technology. Therefore, overall processing procedures of the training processing and the inference processing will not be described here in detail.

F. PERFORMANCE EVALUATIONS

Next, the following describes exemplary performance evaluations of the neural network including reordering embeddings according to the present embodiment.

(f1: Evaluation Conditions)

The following three types of evaluation experiments were performed: (1) English-German; (2) Chinese-English; and (3) Japanese-English.

In the case of (1) English-German, 4,430,000 sentence pairs (inclusive of Common Crawl, News Commentary, Europarl v7.) between the two languages in the WMT14 data set were used as training data. The newstest 2013 data set and the newstest 2014 data set were used as evaluation data and test data.

In the case of (2) Chinese-English, 1,280,000 sentence pairs (Common Crawl, News Commentary, Europarl v7.) between the two languages in the LDC corpus (LDC2002E18, LDC2003E07, LDC2003E14, Hansard part of LDC2004T07, and LDC2005T06) were used as training data. The newstest 2013 data set and the newstest 2014 data set were used as evaluation data and test data. MT06 and MT02/MT03/MT04/MT05/MT08 data sets were used as evaluation data and test data.

In the case of (3) Japanese-English, 2,000,000 sentence pairs between the two languages in the ASPEC corpus (see NPL 8) were used as training data. 1790 sentence pairs were used as evaluation data, and 1812 sentence pairs were used as test data.

(f2: English-German)

As baselines, the following three types were employed: GNMT (see NPL 9); CONVS2S (see NPL 10); and a conventional Transformer (see NPL 1).

Further, for the Transformer according to the present embodiment, evaluations were made on the following configurations: a configuration in which the reordering embedding layer is disposed only on the encoder side ("+Encoder_REs" in the tables); a configuration in which the reordering embedding layer is disposed only on the decoder side ("+Decoder_REs" in the tables); and a configuration in which the reordering embedding layers are disposed on both the encoder side and the decoder side ("+Both_REs" in the tables).

Further, evaluations were also made on the following configurations: a configuration that employs a trained positional embedding layer instead of the positional embedding layer employed in the conventional Transformer ("+Additional PEs" in the table); and a configuration that employs a relative position in a sentence rather than an absolute position employed by the positional embedding layer employed in the conventional Transformer ("+Relative PEs" in the tables) (see NPL 11).

It should be noted that for each of the conventional Transformer and the Transformer according to the present embodiment, evaluations were made on the following two types: a normal type Transformer (base); and a large type Transformer (big). Model parameters are as shown in Table 1 below.

TABLE 1

|  | N, M | $d_{model}$ | $d_{ff}$ | H | $P_{drop}$ | $e_{ls}$ |
|---|---|---|---|---|---|---|
| base | 6 | 512 | 2048 | 8 | 0.1 | 0.1 |
| big | 6 | 1024 | 4096 | 16 | 0.3 | 0.2 |

In Table 1, N represents the number of layers of encoder 200, M represents the number of layers of decoder 400, $d_{model}$ represents the number of dimensions of the input layer and the output layer, $d_{ff}$ represents the number of dimensions of the feed forward layer, H represents the number of parallel branches of the MHA layer, $P_{drop}$ represents a dropout parameter, and $e_{ls}$ represents a parameter of Label Smoothing (overtraining suppression). A batch size was 4096×4 tokens.

Evaluation results on the configurations are shown in Table 2 below. For the performance evaluation, the highest one of the BLEU scores calculated for the evaluation data was employed.

TABLE 2

| System | Architecture | newstest2014 | #Speed1 | #Speed2 | #Params |
|---|---|---|---|---|---|
| Existing NMT systems | | | | | |
| Wu et al. (2016) | GNMT | 26.3 | N/A | N/A | N/A |
| Gehring et al. (2017b) | CONVS2S | 26.36 | N/A | N/A | N/A |
| Vaswani et al. (2017) | Transformer (base) | 27.3 | N/A | N/A | 65.0M |
| Vaswani et al. (2017) | Transformer (big) | 28.4 | N/A | N/A | 213.0M |
| Our NMT systems | | | | | |
| | Transformer (base) | 27.24 | 9910 | 181 | 97.6M |
| | +Additional PEs | 27.10 | 9202 | 179 | 97.6M |
| | +Relative PEs | 27.63 | 4418 | 146 | 97.6M |
| | +Encoder_REs | 28.03++ | 8816 | 179 | 102.1M |
| | +Decoder_REs | 27.61+ | 9101 | 175 | 102.1M |
| | +Both_REs | 28.22++ | 8605 | 174 | 106.8M |
| | Transformer (big) | 28.34 | 4345 | 154 | 272.8M |
| | +Both_REs | 29.11++ | 3434 | 146 | 308.2M |

In Table 2, "#Speed1" represents a training speed (time required for training) and "#Speed2" represents a decoding speed (time required for inference processing). "#Params" represents the total number of the model parameters.

"+" or "++" appearing after the numerical values shown in the table means a result indicating a significant performance improvement as compared with the baselines (it should be noted that as the number of "+" is larger, a degree of performance improvement is higher).

As shown in "+Encoder_REs", "+Decoder_REs", and "+Both_REs" in Table 2, significant improvements in performance are seen as compared with the baselines by disposing the reordering embedding layers. Particularly, it is more effective to dispose the reordering embedding layers on the encoder side.

When the performance of the "+Both_REs" of the "Transformer (base)" is compared with the performance of the "Transformer (big)" (no reordering embedding layer is present), it is indicated that in order to improve the performance, it is effective to dispose the reordering embedding layers on the encoder side and the decoder side instead of increasing the parameter size.

(f3: Chinese-English)

As baselines, the following six types were employed: a conventional Transformer (see NPL 1); RNNsearch+Distortion (see NPL 7); two types of DTMTs (see NPL 12); an RNN-based NMT (see NPL 13); and an RNN-based NMT having MEM added thereto (see NPL 14).

Further, the Transformer according to the present embodiment is the same as that in the case of (1) English-German.

Evaluation results of the configurations are shown in Table 3 below. For the performance evaluation, the highest one of the BLEU scores calculated for the evaluation data was used.

TABLE 3

| | | Test Sets | | | | | |
|---|---|---|---|---|---|---|---|
| System | Architecture | MT02 | MT03 | MT04 | MT05 | MT08 | #Param |
| Existing NMT systems | | | | | | | |
| Vaswani et al. (2017) | Transformer | N/A | N/A | N/A | N/A | N/A | N/A |
| Zhang et al. (2017) | RNNsearch + Distortion | N/A | 38.33 | 40.40 | 36.81 | N/A | N/A |
| Meng and Zhang (2018) | DTMT#1 | 46.90 | 45.85 | 46.78 | 45.96 | 36.58 | 170.5M |
| Meng and Zhang (2018) | DTMT#4 | 47.03 | 46.34 | 47.52 | 46.70 | 37.61 | 208.4M |
| Kong et al. (2018) | RNN-based NMT | N/A | 38.62 | 41.98 | 37.42 | N/A | 87.9M |
| Zhao et al. (2018a) | RNN-based NMT + MEM | N/A | 44.98 | 45.51 | 43.95 | 33.33 | N/A |
| Our NMT systems | | | | | | | |
| | Transformer (base) | 46.45 | 45.33 | 45.82 | 45.57 | 35.57 | 78.3M |
| | +Additional PEs | 46.66 | 45.35 | 46.11 | 45.40 | 35.75 | 78.3M |
| | +Relative PEs | 46.41 | 45.94 | 46.54 | 46.21 | 36.14 | 78.3M |
| | +Encoder_REs | 47.47++ | 45.87++ | 46.82++ | 46.58++ | 36.42++ | 83.0M |
| | +Decoder_REs | 46.80 | 45.43 | 46.23++ | 46.11++ | 36.02+ | 83.0M |
| | +Both_REs | 47.54++ | 45.56++ | 47.27++ | 46.88++ | 36.77++ | 87.6M |
| | Transformer (Big) | 47.76 | 46.66 | 47.51 | 47.71 | 37.73 | 244.7M |
| | +Both_REs | 48.42++ | 47.32++ | 48.22++ | 48.56++ | 38.19+ | 269.7M |

As shown in "+Encoder_REs", "+Decoder_REs", and "+Both_REs" in Table 3, significant improvements in performance are seen as compared with the baselines by disposing the reordering embedding layers. Particularly, it is more effective to dispose the reordering embedding layers on the encoder side.

When the performance of the "+Both_REs" of the "Transformer (base)" is compared with the performance of the "Transformer (big)" (no reordering embedding layer is present), it is indicated that in order to improve the performance, it is effective to dispose the reordering embedding layers on the encoder side and the decoder side instead of increasing the parameter size.

Thus, it is indicated that regardless of the languages, the performance can be improved by employing the reordering embedding layer.

(f4: Japanese-English)

For the Transformer according to the present embodiment, in addition to the configurations employed in the case of (1) English-German and the case of (2) Chinese-English, there was employed a configuration in which preprocessing is performed such that the word order of the source side (source language) becomes close to the word order of the target side (target language) ("+Pre-Reordering" in the table).

Evaluation results of the configurations are shown in Table 4 below. For the performance evaluation, the highest one of the BLEU scores calculated for the evaluation data was used.

TABLE 4

| Systems | Test Set | #Param |
|---|---|---|
| Transformer (base) | 30.33 | 73.9M |
| +Pre-Reordering | 28.93 | 73.9M |
| +Additional PEs | 30.16 | 73.9M |
| +Relative PEs | 30.42 | 73.9M |
| +Encoder_REs | 31.12++ | 78.6M |
| +Decoder_REs | 30.78+ | 78.6M |
| +Both_REs | 31.41++ | 84.4M |
| Transformer (big) | 31.21 | 234.6M |
| +Both_REs | 31.93++ | 273.7M |

Also in Table 4, as shown in "+Encoder_REs", "+Decoder_REs", and "+Both_REs", significant improvements in performance are seen as compared with the baselines by disposing the reordering embedding layers.

In Table 4, it is understandable that the performance of the configuration of "+Pre-Reording" is deteriorated as compared with the baselines. This is presumably because associations between words included in the source side (source language) are reduced by performing the pre-processing such that the word order of the source side becomes close to the word order of the target side (target language).

(f5: Influence of Reordering Information)

Next, the following describes an influence of employing the reordering information on the performance.

Figure 5:
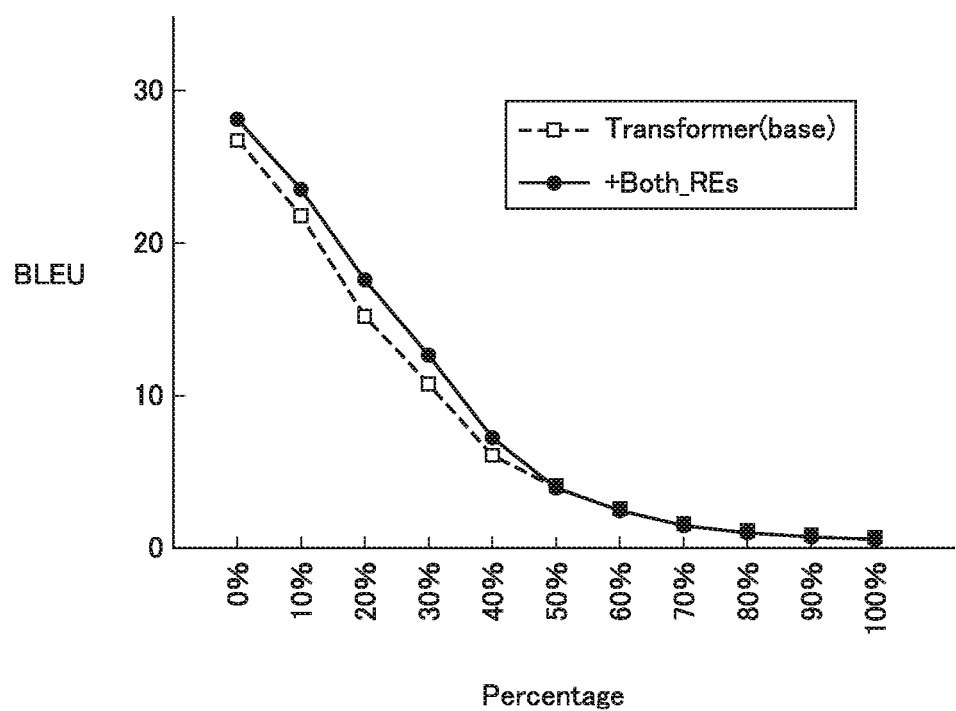
FIG. 5 is a graph showing an influence of reordering information between English and German.
Figure 6:
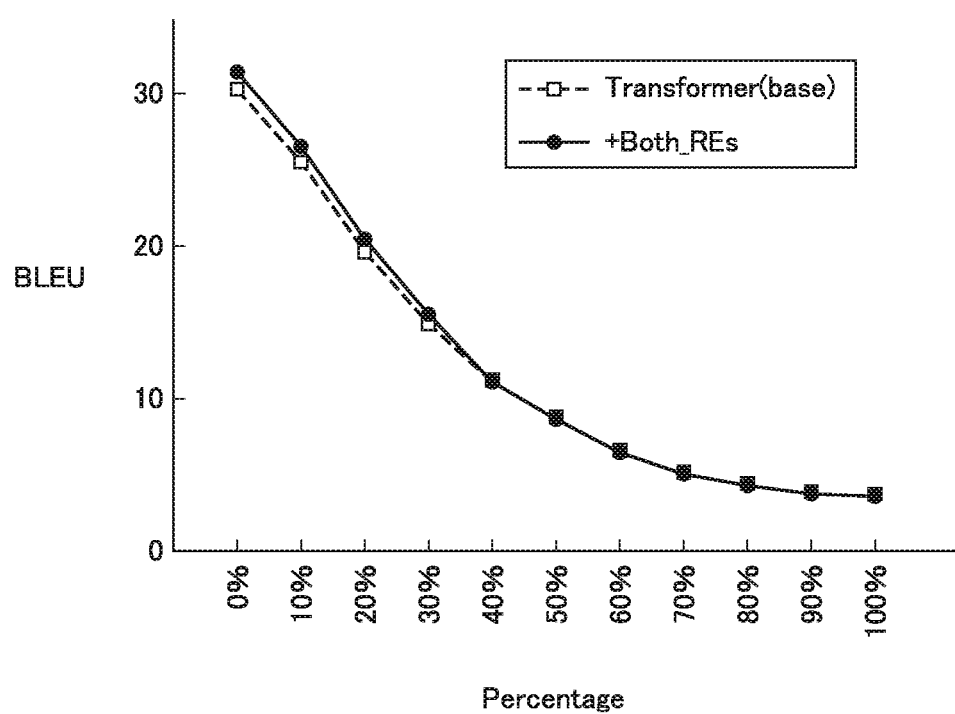
FIG. 6 is a graph showing an influence of reordering information between Chinese and English.
Figure 7:
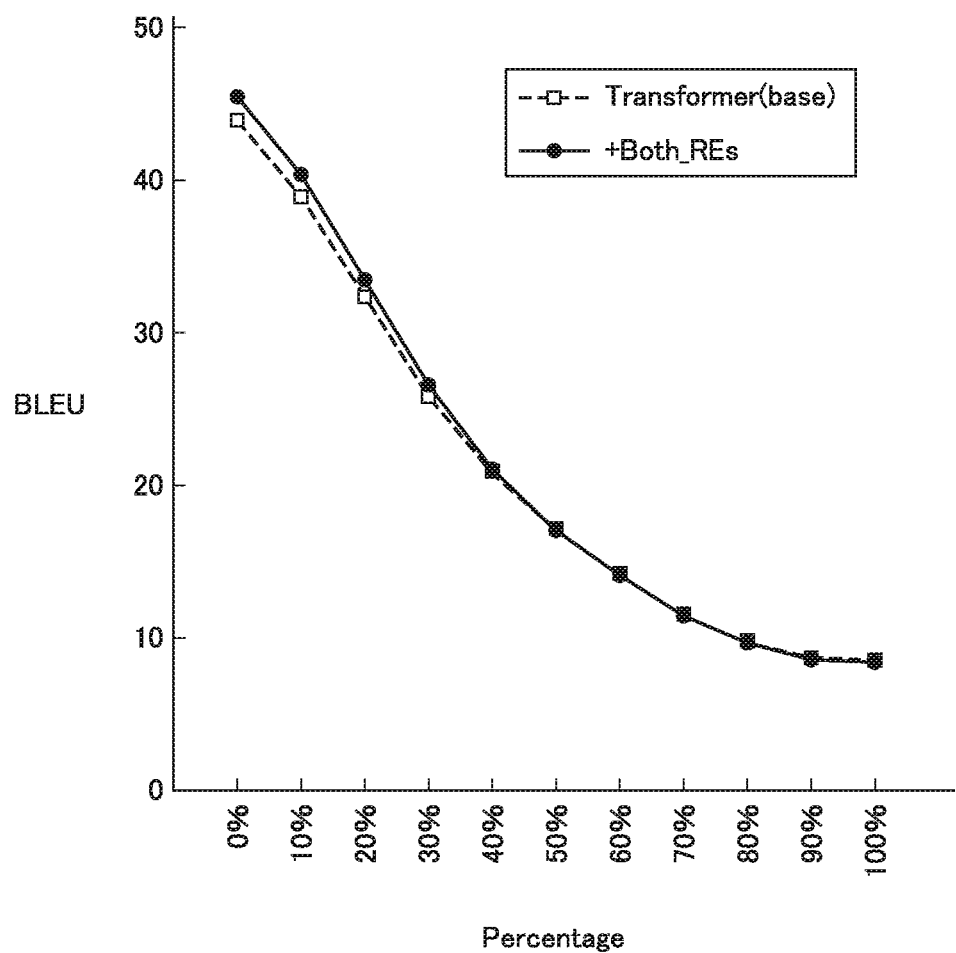
FIG. 7 is a graph showing an influence of reordering information between Japanese and English.

FIG. 5 is a graph showing an influence of the reordering information between English and German. FIG. 6 is a graph showing an influence of the reordering information between Chinese and English. FIG. 7 is a graph showing an influence of the reordering information between Japanese and English.

FIGS. 5 to 7 show results of decoding with the order of words being randomly changed in a source sentence included in the test data. That is, inference results in the case of inputting source sentences with incorrect word orders were evaluated. The horizontal axis of each of the graphs shown in FIGS. 5 to 7 represents a ratio at which the order of words is changed randomly within one source sentence.

The reordering embeddings employed in the Transformer according to the present embodiment supplement information regarding the order of words, and even when the order of words in an input sentence is incorrect, an inference result corresponding to a correct order can be output.

As shown in FIGS. 5 to 7, it can be said that even when about 40% of words in a source sentence are incorrect in order, the Transformer according to the present embodiment can output a correct inference result while suppressing an influence of the incorrectness.

G. MODIFICATION

In the above description, the Transformer has been illustrated as a typical example of the neural network (trained model) that uses positional embeddings, but it is not limited thereto and is applicable to any neural network (trained model).

For example, it is also applicable to a CNN (convolutional neural network) based neural translation or the like. Further, the technical idea of the present invention is also applicable not only to translation tasks, but also to a neural network (trained model) that uses positional information of a token in an input sequence.

H. CONCLUSION

According to the training processing according to the present embodiment, improvement can be made in performance of a neural network that uses positional embeddings each indicating a position at which a token is present in an input sequence, such as Transformer.

The embodiments disclosed herein are illustrative and non-restrictive in any respect. The scope of the present invention is defined by the terms of the claims, rather than the description of the embodiments described above, and is intended to include any modifications within the scope and meaning equivalent to the terms of the claims.

REFERENCE SIGNS LIST

2: input sequence; 4: input embedding layer; 8, 18, 36, 56: adder; 6: positional embedding layer; 14: output embedding layer; 20, 20A: encoder block; 22, 46: MHA layer; 24, 28, 44, 48, 52: add & norm layer; 26, 50: feed forward layer; 40, 40A: decoder block; 42: MMHA layer; 60: linear combination layer; 62: softmax layer; 64: output sequence; 90: training data set; 100, 100A: Transformer; 200: encoder; 400: decoder; 500: information processing device; 502: CPU; 504: GPU; 506: main memory; 508: display; 510: network interface; 512: secondary storage device; 514: training program; 516: model definition data; 518: parameter set; 520: inference program; 522: input device; 524: optical drive; 526: optical disk; 528: internal bus.

The invention claimed is:

1. An information processing device that implements an inferencer with a trained neural network that outputs an output sequence corresponding to an input sequence, the information processing device comprising:
a memory that stores program code; and
one or more processors,
wherein at least one of the one or more processors accesses the program code and executes the program code to cause the at least one of the one or more processors to implement an encoder that outputs an intermediate sentence representation from the input sequence,
at least one of the one or more processors accesses the program code and executes the program code to cause the at least one of the one or more processors to implement a decoder that outputs the output sequence based on the intermediate sentence representation output from the encoder and an output sequence output previously,
at least one of the encoder and the decoder includes:
a multi-head attention layer that generates the intermediate sentence representation by inputting a first sentence representation to a trained self-Attention network, the first sentence representation having information indicating a value of each token included in a first sequence and first positional information indicating a position at which each token is present in the first sequence, the trained self-Attention network being trained by using sets of query and memory, wherein in the encoder the first sequence corresponds to the input sequence, and wherein in the decoder the first sequence corresponds to the output sequence output previously, a reordering embedding layer that generates a hidden state representation by determining a positional penalty vector in accordance with an activation function having, as an input, a linear combination of the first sentence representation and the intermediate sentence representation, determining second positional information by multiplying the first positional information by the determined positional penalty vector, and performing layer regularization for an addition result of the second positional information and the intermediate sentence representation, and a feed forward layer that generates a second sentence representation by performing layer regularization for an addition result of the hidden state representation and a positional shifted result of the intermediate sentence representation and the hidden state representation, wherein in the encoder the intermediate sequence representation is generated based on the second sentence representation, and wherein in the decoder the output sequence is generated based on the second sentence representation.

2. An inference method for outputting an output sequence corresponding to an input sequence using a trained neural network, the inference method comprising:

outputting, by an encoder, an intermediate sentence representation from the input sequence; and outputting, by a decoder, the output sequence based on the intermediate sentence representation output from the encoder and an output sequence output previously, wherein at least one of outputting the intermediate sentence representation and outputting the output sequence includes:

generating, by a multi-head attention layer, the intermediate sentence representation by inputting a first sentence representation to a trained self-Attention network, the first sentence representation having information indicating a value of each token included in a first sequence and first positional information indicating a position at which each token is present in the first sequence, the trained self-Attention network being trained by using sets of query and memory, wherein in the encoder the first sequence corresponds to the input sequence, and wherein in the decoder the first sequence corresponds to the output sequence output previously, generating, by a reordering embedding layer, a hidden state representation by determining a positional penalty vector in accordance with an activation function having, as an input, a linear combination of the first sentence representation and the intermediate sentence representation, determining second positional information by multiplying the first positional information by the determined positional penalty vector, and performing layer regularization for an addition result of the second positional information and the intermediate sentence representation, and generating, by a feed forward layer, a second sentence representation by performing layer regularization for an addition result of the hidden state representation and a positional shifted result of the intermediate sentence representation and the hidden state representation, wherein in the encoder the intermediate sequence representation is generated based on the second sentence representation, and wherein in the decoder the output sequence is generated based on the second sentence representation.

3. A non-transitory storage medium storing thereon an inference program for outputting an output sequence corresponding to an input sequence using a trained neural network which, when executed by one or more processors, causes the one or more processors to at least:

output, by an encoder, an intermediate sentence representation from the input sequence; and output, by a decoder, the output sequence based on the intermediate sentence representation output from the encoder and an output sequence output previously, wherein at least one of outputting the intermediate sentence representation and outputting the output sequence includes:

generating, by a multi-head attention layer, the intermediate sentence representation by inputting a first sentence representation to a trained self-Attention network, the first sentence representation having information indicating a value of each token included in a first sequence and first positional information indicating a position at which each token is present in the first sequence, the trained self-Attention network being trained by using sets of query and memory, wherein in the encoder the first sequence corresponds to the input sequence, and wherein in the decoder the first sequence corresponds to the output sequence output previously, generating, by a reordering embedding layer, a hidden state representation by determining a positional penalty vector in accordance with an activation function having, as an input, a linear combination of the first sentence representation and the intermediate sentence representation, determining second positional information by multiplying the first positional information by the determined positional penalty vector, and performing layer regularization for an addition result of the second positional information and the intermediate sentence representation, and generating, by a feed forward layer, a second sentence representation by performing layer regularization for an addition result of the hidden state representation and a positional shifted result of the intermediate sentence representation and the hidden state representation, wherein in the encoder the intermediate sequence representation is generated based on the second sentence representation, and wherein in the decoder the output sequence is generated based on the second sentence representation.

* * * * *